(12) United States Patent
Komissarov

(10) Patent No.: US 11,349,809 B2
(45) Date of Patent: May 31, 2022

(54) SYSTEM AND METHOD OF BLOCKING ADVERTISING ON COMPUTING DEVICES

(71) Applicant: AO Kaspersky Lab, Moscow (RU)

(72) Inventor: Alexey P. Komissarov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 312 days.

(21) Appl. No.: 16/427,903

(22) Filed: May 31, 2019

(65) Prior Publication Data

US 2020/0259790 A1 Aug. 13, 2020

(30) Foreign Application Priority Data

Feb. 7, 2019 (RU) .......................... RU2019103363

(51) Int. Cl.
*H04L 9/40* (2022.01)
*H04L 67/01* (2022.01)

(52) U.S. Cl.
CPC ...... *H04L 63/0236* (2013.01); *H04L 63/0263* (2013.01); *H04L 63/1408* (2013.01); *H04L 63/1441* (2013.01); *H04L 67/42* (2013.01)

(58) Field of Classification Search
CPC ............. H04L 63/0236; H04L 63/0263; H04L 63/1408; H04L 63/1441; H04L 67/42
See application file for complete search history.

(56) References Cited

U.S. PATENT DOCUMENTS

| 2008/0209057 | A1 | 8/2008 | Martini et al. |
| 2015/0019350 | A1* | 1/2015 | Grant ................. G06Q 30/0275 705/14.71 |
| 2015/0281262 | A1 | 10/2015 | Cai et al. |
| 2016/0099961 | A1 | 4/2016 | Paugh et al. |
| 2016/0191466 | A1* | 6/2016 | Pernicha ................ H04L 63/20 726/1 |
| 2016/0330245 | A1* | 11/2016 | Bell .................... H04L 63/1433 |
| 2018/0101507 | A1 | 4/2018 | Malca |
| 2018/0375686 | A1* | 12/2018 | Rangaraman ....... H04L 47/2408 |
| 2020/0252803 | A1* | 8/2020 | Shah ..................... G06N 20/20 |

FOREIGN PATENT DOCUMENTS

| CN | 108270786 A | 7/2018 |
| KR | 20180040390 A | 4/2018 |

* cited by examiner

*Primary Examiner* — Minh Chau Nguyen
(74) *Attorney, Agent, or Firm* — ArentFox Schiff LLP; Michael Fainberg

(57) ABSTRACT

Disclosed herein are systems and methods for blocking information from being received on a computing device. In one aspect, an exemplary method comprises, by a hardware processor, intercepting a Domain Name System (DNS) request, the intercepted DNS request being associated with the information being blocked from the computing device, obtaining a set of rules for a transmission of the intercepted DNS request, determining, whether at least one rule of the obtained set of rules subscribes to a blocking of the transmission of the intercepted DNS request, and blocking the transmission of the intercepted DNS request when at least on rule of the set of rules subscribes to the blocking of the transmission of the intercepted DNS request, wherein the blocking of the transmission of the intercepted DNS request blocks the information from being received on the computing device.

11 Claims, 3 Drawing Sheets

SYSTEM AND METHOD OF BLOCKING ADVERTISING ON COMPUTING DEVICES

CROSS REFERENCE TO RELATED APPLICATIONS

The present application claims priority to Russian Patent Application No. 2019103363, filed on Feb. 7, 2019, the entire content of which is incorporated herein by reference.

FIELD OF TECHNOLOGY

The present disclosure relates to the field of blocking information, e.g., advertisement, on computing devices, e.g., mobile computing devices, to improve user experience, more specifically blocking advertising messages.

BACKGROUND

At present, mobile computing devices (such as smartphones and tablets) are used by people every day to handle all possible tasks or for entertainment. A multitude of all possible applications exists for communicating, time scheduling, viewing Internet pages, controlling one's bank account, and so forth. Some of these applications are distributed for a price, others are free of charge.

The applications which are distributed free of charge are characterized by the presence of advertising, which is displayed during the use of the application. In this way, the developers monetize the results of their work. However, often such advertising is overly intrusive or may even be harmful to the user or his/her device, for example, by displaying links to malicious files or sites.

One method for protecting the computing devices of the users against advertising is blocking advertisements to be displayed to users using black lists of forbidden resources and intercepting DNS (Domain Name System) requests. However, for devices under the control of the iOS operating system, such methods involve blocking the connections established by the advertising modules of the applications, making use of VPNs, or proxy servers. Moreover, such methods are power hungry, and may also prove to be uneconomical, in terms of the payment for a volume of data transmitted over a network.

Hence, there is a need for an effective way of protecting a user of a mobile computing device against advertisements.

SUMMARY

Aspects of the disclosure relate to the field of user experience and advertisements, more specifically to systems and methods for blocking information, e.g., advertisements, from being received on a computing device, e.g., for blocking advertising on computing devices.

In one exemplary aspect, a method is implemented in a computer comprising a hardware processor, the method comprising: intercepting a Domain Name System (DNS) request, the intercepted DNS request being associated with the information being blocked from the computing device, obtaining a set of rules for a transmission of the intercepted DNS request, determining, whether at least one rule of the obtained set of rules subscribes to a blocking of the transmission of the intercepted DNS request, and blocking the transmission of the intercepted DNS request when at least on rule of the set of rules subscribes to the blocking of the transmission of the intercepted DNS request, wherein the blocking of the transmission of the intercepted DNS request blocks the information from being received on the computing device.

According to one aspect of the disclosure, a system is provided for blocking information from being received on a computing device, the system comprising a hardware processor configured to: intercept a Domain Name System (DNS) request, the intercepted DNS request being associated with the information being blocked from the computing device, obtain a set of rules for a transmission of the intercepted DNS request, determine, whether at least one rule of the obtained set of rules subscribes to a blocking of the transmission of the intercepted DNS request, and block the transmission of the intercepted DNS request when at least on rule of the set of rules subscribes to the blocking of the transmission of the intercepted DNS request, wherein the blocking of the transmission of the intercepted DNS request blocks the information from being received on the computing device.

In one exemplary aspect, a non-transitory computer-readable medium is provided storing a set of instructions thereon for blocking information from being received on a computing device, wherein the set of instructions comprises instructions for: intercepting a Domain Name System (DNS) request, the intercepted DNS request being associated with the information being blocked from the computing device, obtaining a set of rules for a transmission of the intercepted DNS request, determining, whether at least one rule of the obtained set of rules subscribes to a blocking of the transmission of the intercepted DNS request, and blocking the transmission of the intercepted DNS request when at least on rule of the set of rules subscribes to the blocking of the transmission of the intercepted DNS request, wherein the blocking of the transmission of the intercepted DNS request blocks the information from being received on the computing device.

In one aspect, the set of rules is obtained based on at least one of: one or more Universal Resource Locators (URLs) in the intercepted DNS request, and information obtained about the application making the DNS request.

In one aspect, the obtaining of the set of rules comprises: selecting the set of rules from a database based on the one or more URLs in the intercepted DNS request, and the information about the application making the DNS request.

In one aspect, the obtaining of the set of rules further comprises: estimating a probability of the intercepted DNS request being a DNS request that was initiated by one or more actions of a user.

In one aspect, the obtaining of the set of rules further comprises: estimating a probability of the intercepted DNS request having a characteristic of a DNS request made for a subsequent downloading of information from a remote server.

In one aspect, the interception of the DNS request includes at least one of: an identification of an application making the DNS request, and obtaining information about one or more Universal Resource Locators (URLs) from the DNS request.

In one aspect, the interception of the DNS request is performed using a DNS proxy provider.

The blocking advertising on computing devices in accordance with the teachings of the present disclosure improves user experience with the device and applications accessed via the device. The improvement is achieved: by intercepting a DNS request that is associated with the information being blocked from the computing device, obtaining a set of rules for a transmission of the intercepted DNS request, determining, whether at least one rule of the obtained set of rules subscribes to a blocking of the transmission of the intercepted DNS request, and blocking the transmission of the intercepted DNS request when at least on rule of the set of rules subscribes to the blocking of the transmission of the intercepted DNS request.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for blocking information, e.g., advertising, on computing devices. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

In order to present the teachings of the present disclosure with clarity, a number of terms and concepts, as used in describing various aspects of the disclosure, are defined herein.

DNS Proxy Provider is an application extension for the iOS operating system, realized by a class of NEDNSProxy-Provider. When this extension is present, the DNS requests from applications containing may be intercepted. The intercepted DNS request contains a Universal Resource Locator (URL). Then, the domain name of the server and the IP address for which the DNS request is made is determined. In addition, the extension may be used to determine the source of the request—i.e., the application making the request. In particular, the identifier of the application making the request, e.g., the name or a unique identifier of the application, may be determined.

Advertising is information propagated by any method, in any form, and with the use of any device, addressed to an undefined group of persons and aimed at: drawing attention to the object of the advertising, forming or maintaining interest in the object of the advertising, and promoting the object of the advertising in the marketplace.

In one aspect, a system for blocking unwanted information, e.g., for blocking advertising, on computing devices in accordance with the teachings of the present disclosure includes real-world devices, systems, components, and groups of components realized with the use of hardware such as integrated microcircuits (application-specific integrated circuit, ASIC) or field-programmable gate arrays (FPGA), or, for example, in the form of a combination of software and hardware such as a microprocessor system and set of program instructions, and also on neurosynaptic chips. The functionality of such system modules may be realized solely by hardware, and also in the form of a combination, where some of the functionality of the system modules is realized by software, and some by hardware. In certain aspects, some of the modules or all of the modules may be executed on the processor of a general-purpose computer (such as the one shown in FIG. 3). Furthermore, components of the system may be realized either within a single computing device or spread out among several interconnected computing devices.

Figure 1:
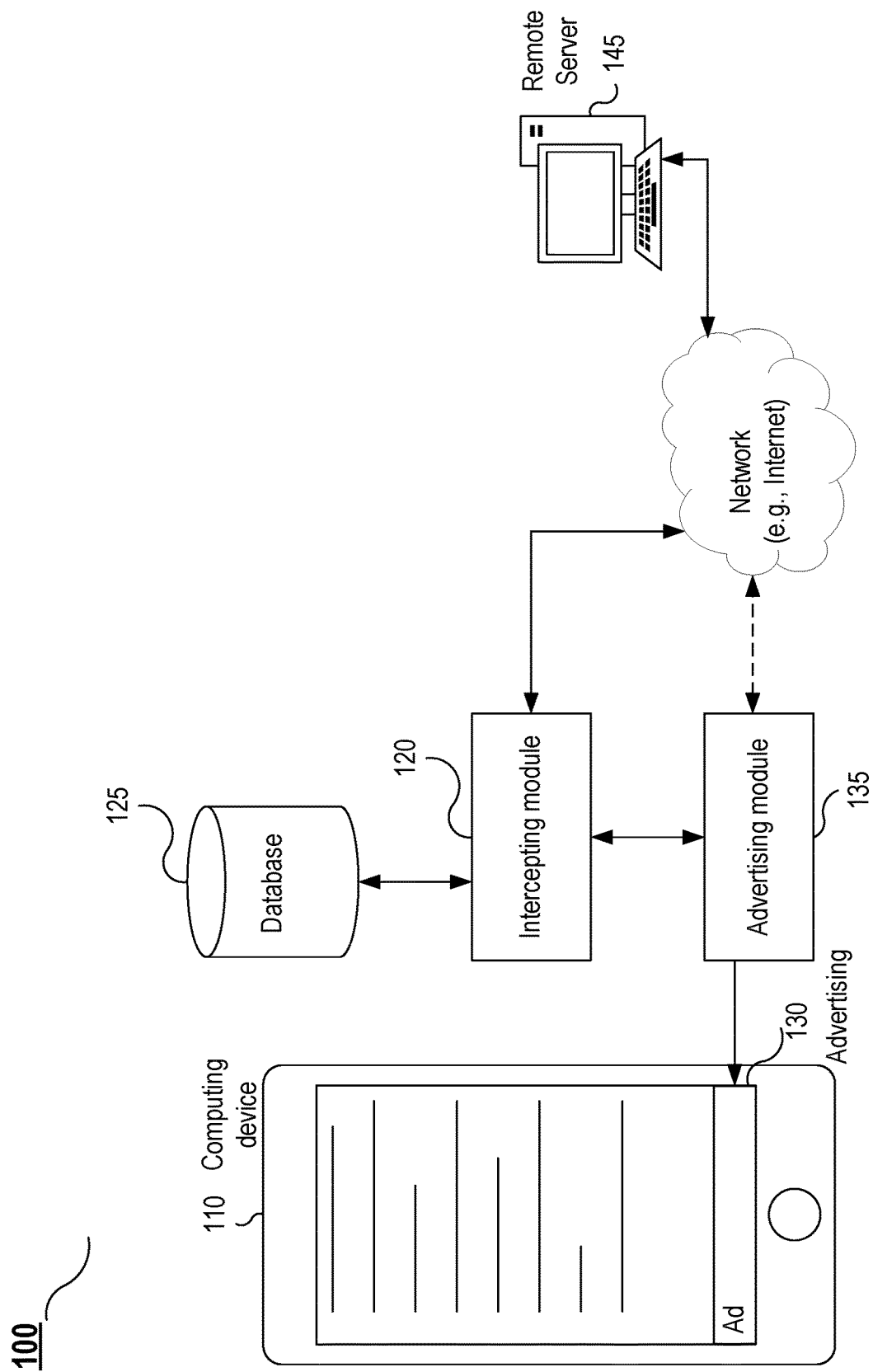
FIG. 1 is a block diagram illustrating an exemplary system for blocking information, e.g., advertising, on computing devices in accordance with aspects of the present disclosure.

FIG. 1 is a block diagram illustrating an exemplary system 100 for blocking information, e.g., advertising, on computing devices in accordance with aspects of the present disclosure. The system 100 for blocking advertising on computing devices includes an intercepting module 120.

The intercepting module 120 is designed to block the displaying of unwanted information being downloaded from a remote server 145 and being displayed on the output device of a computing device 110. For example, the unwanted information may be displayed on a screen of the computing device or a screen on a peripheral device connected to the computing device. A particular instance of such information is an advertising 130.

It should be noted that exemplary aspects of the present disclosure shall be described in relation to advertising, but the teachings of the present disclosure are not limited solely to blocking advertising, but may be utilized for the blocking of any information the displaying of which requires the information to be downloaded from a server. It is noted that the requirement for the downloading of the information from the server necessitates DNS requests. A particular instance of the computing device 110 is a mobile computing device—a mobile telephone, a smartphone, a tablet computer, or any other portable computing device.

The computing device 110 comprises a module for displaying of the unwanted information on the screen of the computing device 110 which contains executable or interpretable codes.

In one aspect, the module for displaying of the unwanted information is an advertising module 135. In the event that the computing device 110 is a mobile computing device, the advertising module 135 is an application component running on the computing device. Examples of such modules are the advertising modules based on program libraries such as: AdMob, AdSence, Firebase, iAd, and the like. In one aspect, when the computing device 110 is a mobile computing device, the intercepting module 120 is an application component running on the computing device. For example, when the advertising module 135 which is an application component running on the computing device (e.g., AdMob, AdSense, etc.) attempts to send a DNS request, the intercepting module 120 (which is also an application component running on the computing device 110) intercepts the DNS request.

In one aspect, the advertising module 135 is an independent application. In another aspect, the advertising module 135 is a component of another application designed for monetization, such as an application for exchanging messages or for visiting web pages.

Without loss of generality, for the further description of the teachings of the present disclosure, the computing device 110 shall be considered a mobile computing device under the control of the iOS operating system.

For the displaying of the advertising 130, the advertising module 135 downloads the corresponding materials (e.g., content) from a remote server 145, which provides the materials for various advertising campaigns. The downloading of the data for display as an advertising 130 is preceded by sending a DNS request by the advertising module 135. The DNS request is made in order to determine the IP address of the server 145 on the basis of the uniform resource locator (URL) of the server 145, in particular the server's domain name. Thus, the problem of protecting a user (i.e., a user's device) against advertising may be interpreted as: a problem of identifying the making of a DNS request, the DNS request being for a subsequent downloading of advertising.

In one aspect of the present disclosure, the intercepting module 120 is used to protect the user against an advertising 130 by intercepting the DNS requests coming from the computing device 110, i.e., DNS requests coming from an advertising module 135 of the computing device 110. In one aspect, the intercepting module 120 may be realized with the aid of a DNS Proxy Provider.

As described above, the various modules, e.g., the intercepting module 120, the advertising module 135, etc., may be applications running on the computing device 110. As such, the hardware processor of the computing device 110, e.g., a mobile device, is used to execute the codes of the applications, such as codes of the intercepting module 120 and the advertising module 135.

In one aspect, when the DNS request is intercepted, the URL is obtained for the advertising resources residing on the server 145, and information is obtained about the application making that request. The URL is obtained from the intercepted DNS request. Some examples of URLs obtained from an intercepted DNS request include:

ads.mopub.com;
ads.nexage.com;
ad.mail.ru;
ws.tapjoyads.com; and
config.unityads.unity3d.com.

In one aspect, the information about the application includes at least the identifier of the application. For example, the information may include the name of the application, a checksum of the application, etc.

In one aspect, the information about the application is obtained, by the intercepting module 120, in a form of an object NEFlowMetaData. In one aspect, the obtaining of the set of rules comprises selecting the set of rules from a database 125. It is noted that the database 125 may reside within the computing device 110 or in a peripheral device. For example, if the computing device 110 is a mobile device (e.g., smartphone), the database 125 may be in a storage location within the mobile device.

Once the information about the application is obtained, the intercepting module 120 obtains a set of rules for the transmission of the DNS request based on the URL and the information obtained about the application. In other words, the set of rules is obtained based on: the URL in the intercepted DNS request, and the information about the application making the DNS request, where the information about the application including at least an identifier of the application, e.g., the name of the application, the checksum of the application, etc.

In one aspect, a rule of the set of rules for transmission of a DNS request contains: the information about the application making the DNS request, information on at least one URL, and at least one action prescribed by the rule regarding the DNS request. For example, the at least one action may include blocking transmission of the intercepted DNS request. The blocked action is the action associated with the rule obtained based on the information about the application.

The intercepting module 120 obtains from the database 125 a set of rules such that each selected rule of the set of rules satisfies the following conditions:
 the information about the application making the DNS request concurs with the information about the application contained in the rule for transmission of the DNS request; and
 the URL from the DNS request made by the application corresponds to the information about the URL contained in the rule for transmission of the DNS request.

In one aspect, the URL from the DNS request made by the application corresponds to the information about the URL contained in the rule for transmission of the DNS request when there is an exact concurrence, or covering by a mask of the URL or by a regular expression.

In one aspect, the information about the URL, which is stored in the rule, may constitute the URL, the mask of the URL, or the regular expression for describing the URL. The information about the URL that needs to be contained in the DNS request in order for the rule to be selected by the intercepting module 120 for a particular DNS request comprises:

\*.\*ads.\*.com; and
ads.\*.com.

In one aspect, after the selection of the rule by the intercepting module 120, the intercepting module 120 carries out the action prescribed by the rule for transmission of the DNS request. For example, the transmission of the DNS request may be blocked.

In yet another aspect, the rule may further prescribe the following actions:
 display to the user a message asking whether to display or block the advertising 130;
 on an area of the screen where the advertising 130 should be displayed, display to the user a message above it asking whether to display or block the advertising 130.

In one aspect, the intercepting module 120 carries out the action prescribed by the rule when additional conditions contained in the rule for transmission of the DNS request are satisfied. In one aspect, the additional conditions include:
 a condition for the URL from the DNS request to correspond to the URL of an advertising server; and
 a condition for a probability of the DNS request being initiated by an action of the user of the computing device 110 being less than or equal to an established threshold, such as 80% (0.8).

In one aspect, the probability of the DNS request was initiated by one or more actions of the user of the computing device is determined by the following formula:

$$P = \frac{(2 * \mathrm{arc}tg(\Sigma x_i))/\pi + 1}{2},$$

where, P represents the probability that the DNS request was initiated by the one or more actions of the user of the computing device; and $x_i$ represents a weighting factor of one of a plurality of conditions, as described below.

Each condition of the plurality of conditions is fulfilled for certain information about the DNS request. In other words, a conditions is fulfilled for information about the URL and/or application making the DNS request. In one aspect, a weighting factor for a condition may take on different values.

In one aspect, the plurality of conditions comprises at least one of the following conditions:
(1) The URL from the DNS request does not correspond to the URL, the mask of the URL, or the regular expression of the URL of a known advertising server. Then, for example, the weighting factor may be equal to 1.
(2) The application making the DNS request is a browser. Then, for example, the weighting factor may be equal to 0.4.
(3) The application making the DNS request is a game. Then, the weighting factor may be equal to −0.5.
(4) The domain of a URL second level from the DNS request has already been visited with the aid of the application making the DNS request in a certain interval of time t prior to the present, e.g., t is 5 days. Then, the weighting factor may be equal to 0.5.
(5) The URL from the DNS request is present in many URLs associated with the application. Then, the weighting factor may be equal to 0.2.

The set of URLs associated with the application may be saved in the database 125 in such a way that each identifier of the application is placed in correspondence with one or more URL addresses, masks or regular expressions of URL addresses, the accessing of which (and also the corresponding DNS requests) is typical for the given application. The set of URLs associated with the application (i.e., the information saved in the database 125) is stored and updated remotely by a specialist, for example, in the field of computer security. One example of a link that associates the application and the set of URLs is the application Yandex.Translator and its associated URL ad.yandex.ru.

In one aspect, the conditions described above and the corresponding weighting factors, may be kept in the database 125. In one aspect, the conditions and the corresponding weighting factors may be stored and updated remotely in the database 125 by a specialist, for example, in the field of computer security.

In one aspect, the set of selected rules is used by the intercepting module 120 to carry out the actions prescribed by the rules. Furthermore, in one aspect, when actions are being selected among all the prescribed actions, the action of blocking the DNS request has a highest priority.

In one aspect, if at least one rule of the set of rules for transmission of the DNS request from the database 125 subscribes the blocking of the DNS request, then the transmission of the DNS request is blocked. Thus, if one rule of the set of rules subscribes to the blocking of the DNS request, a DNS request made by the advertising module 135 for the downloading and displaying of advertising 130 will be blocked by the intercepting module 120.

Figure 2:
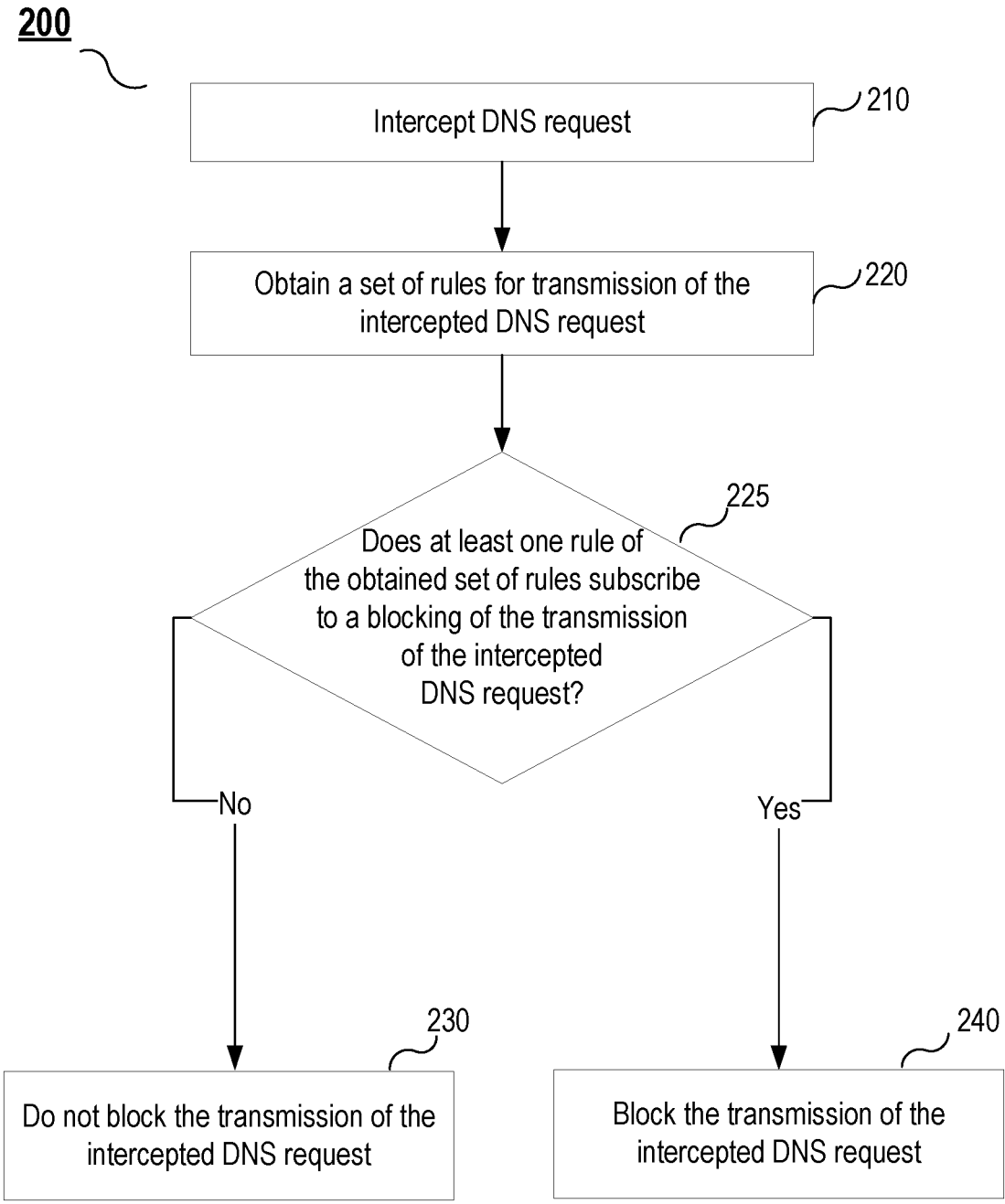
FIG. 2 is a flow diagram illustrating an exemplary method for blocking information, e.g., advertising, on computing devices.

FIG. 2 is a flow diagram illustrating an exemplary method 200 for blocking information (unwanted) from being received on a computing device in accordance with aspects of the present disclosure. For example, when the unwanted information is an advertisement, the method 200 may be used for blocking advertisement from being received on the computing device.

In step 210, the method intercepts a DNS request. The interception of the DNS request may be performed by a hardware processor of a computing device running an application that performs the functions of the intercepting module 120, described above. It is noted that the intercepted DNS request is associated with the information that is being blocked from being received by the computing device in accordance with the teachings of the present disclosure.

In one aspect, the interception of the DNS request includes an identification of an application making the DNS request, and obtaining information about one or more URLs from the DNS request. In one aspect, the interception of the DNS request is performed with the aid of a DNS Proxy Provider.

The intercepting module 120 is tasked with determination of the extent to which such a DNS request is characteristic of a DNS request made by the application for a DNS request made by a given advertising module, e.g., the advertising module 135.

In step 220, the method obtains a set of rules for a transmission of the intercepted DNS request. The obtaining of the set of rules may be performed by the intercepting module 120. In one aspect, the set of rules are obtained by selecting from a database 125 on the basis of the information obtained during the interception of the DNS request. The database 125 and the intercepting module 120 may be implemented on the same device, e.g., the computing device 110.

In one aspect, during the selection of the set of rules, the intercepting module 120 makes an estimation as to a probability of the intercepted DNS request being a DNS request that was initiated by one or more actions of the user. In another aspect, the intercepting module 120 makes an estimation as to a probability of the intercepted DNS request being characteristic of a DNS request made by an advertising module for a subsequent downloading of an advertising from a remote server. For example, the intercepting module 120 makes an estimation as to the probability of the intercepted DNS request being characteristic of a DNS request made by the advertising module 135 for a subsequent downloading of an advertising 130 from a remote server 145.

In step 225, the method determines whether at least one rule of the obtained set of rules subscribes to a blocking of the transmission of the intercepted DNS request. If at least on rule of the set of rules subscribes to the blocking of the transmission of the intercepted DNS request, the method proceeds to step 240. Otherwise, the method proceeds to step 230.

In step 230, the method 200 does not block the transmission of the DNS request. In one aspect, when the method does not block the transmission of the DNS request, the DNS request is allowed to be transmitted. It is noted that the transmission of the DNS request may be blocked for other reasons, e.g., by other modules, even when it is allowed to proceed by the intercepting module 120.

In step 240, the method, e.g., the method 200 of the intercepting module 120, blocks the transmission of the DNS request, wherein the blocking of the transmission of the intercepted DNS request blocks the information from being received on the computing device.

In one aspect, the rules for transmission of the DNS request are kept in a database, e.g., database 125. In one aspect, the transmission of the DNS request is blocked when the URL of the request corresponds to a URL of a server designed to distribute unwanted information to the user. For example, the server may by designed to distribute an advertisement (e.g., the server is an advertising server), a phishing information, and so forth.

As described above, the present disclosure describes systems and methods for blocking advertising on computing devices. One advantage of the method of the present disclosure is blocking DNS requests that are not initiated by actions of the user. For example, DNS requests, e.g., made by an advertising module 135, are prevented from being downloaded from a remote server, e.g., a remote server 145. The characteristics of DNS requests made by the advertising module 135 are used to distinguish such requests from DNS requests initiated by the actions of the user, thereby enabling blocking of such undesired advertisements. Accordingly, the teachings of the present disclosure solve technical problems associated with the displaying of unwanted information on the output device of a user's computing device, especially advertising. The technical result is achieved by blocking the downloading of advertising, e.g., advertising 130 (generally, advertising data) onto the computing device of the user 110.

Figure 3:
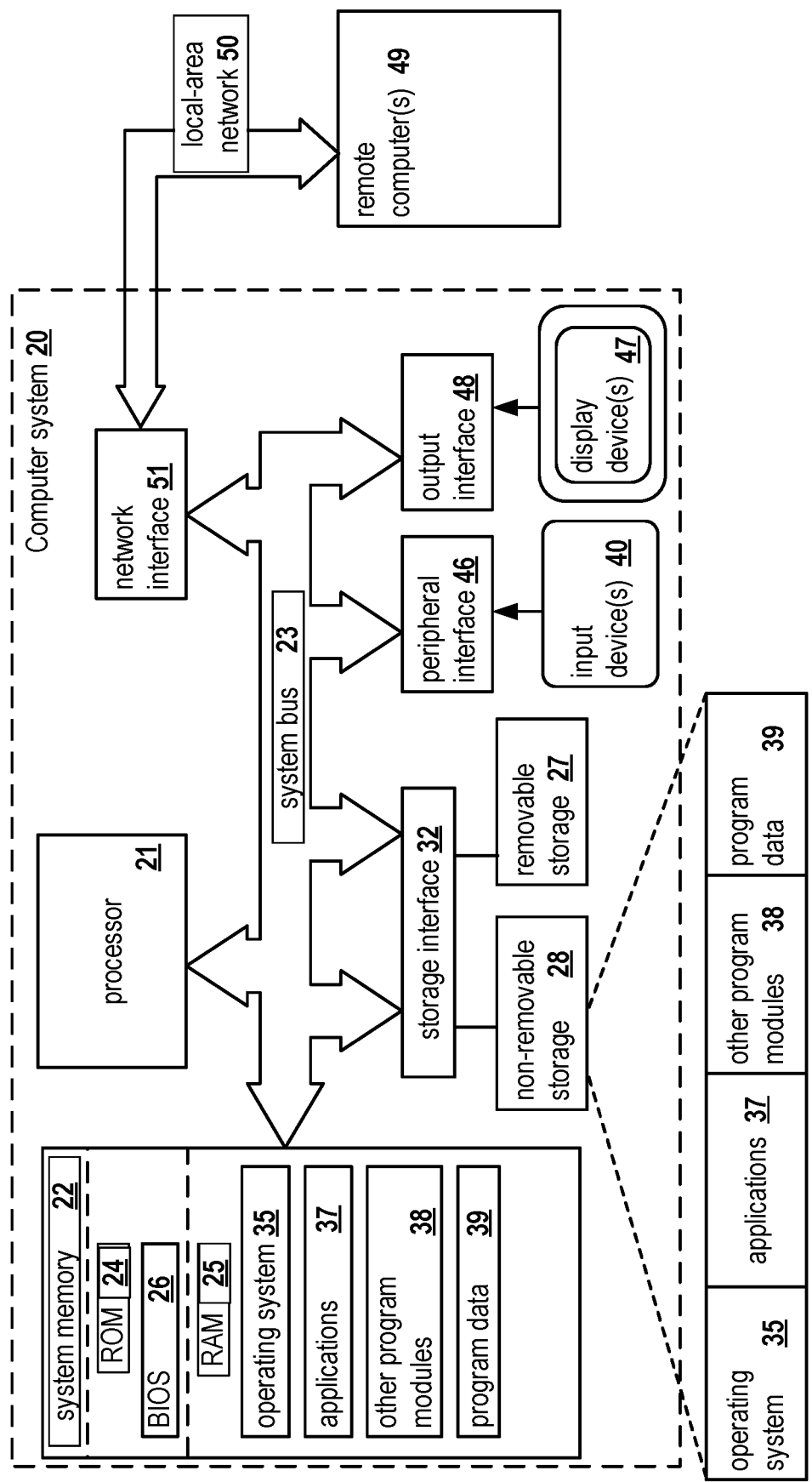
FIG. 3 presents an example of a general-purpose computer system on which aspects of the present disclosure can be implemented.

FIG. 3 is a block diagram illustrating a computer system 20 on which aspects of systems and methods for blocking advertising on computing devices may be implemented in accordance with an exemplary aspect. It should be noted that the computer system 20 can correspond to a virtual machine on a computing device, for example, as described earlier the intercepting module may be deployed on a virtual machine. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 3, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for blocking information from being received on a computing device, the method comprising:

intercepting, by a processor of the computing device, a Domain Name System (DNS) request, the intercepted DNS request being associated with the information being blocked from the computing device, wherein the interception of the DNS request includes at least one of: an identification of an application making the DNS request, and obtaining information about one or more Universal Resource Locators (URLs) from the DNS request;

obtaining, by the processor of the computing device, a set of rules for a transmission of the intercepted DNS request, wherein the obtaining of the set of rules comprises selecting the set of rules from a database based on the one or more URLs in the intercepted DNS request and information about the application making the DNS request, wherein the information about the application includes at least an identifier of the application, and wherein in each selected rule of the set of rules: the information about the application making the DNS request corresponds to information about the application contained in the selected rule and the URL from the intercepted DNS request made by the application corresponds to information about the URL contained in the selected rule;

determining, by the processor of the computing device, whether at least one rule of the obtained set of rules subscribes to a blocking of the transmission of the intercepted DNS request; and blocking, by the processor of the computing device, the transmission of the intercepted DNS request when at least one rule of the set of rules subscribes to the blocking of the transmission of the intercepted DNS request, wherein the blocking of the transmission of the intercepted DNS request blocks the information from being received on the computing device.

2. The method of claim 1, wherein the obtaining of the set of rules further comprises:

estimating a probability of the intercepted DNS request being a DNS request that was initiated by one or more actions of a user and wherein the blocking the transmission of the intercepted DNS request further comprises selectively blocking the transmission of the intercepted DNS request based on the estimated probability.

3. The method of claim 1, wherein the obtaining of the set of rules further comprises:
   estimating a probability of the intercepted DNS request having a characteristic of a DNS request made for downloading of advertising information from a remote server
   and wherein the blocking the transmission of the intercepted DNS request further comprises selectively blocking the transmission of the intercepted DNS request based on the estimated probability.

4. The method of claim 1, wherein the interception of the DNS request is performed using a DNS proxy provider.

5. A system for blocking information from being received on a computing device, comprising:
   at least one processor of the computing device configured to:
      intercept a Domain Name System (DNS) request, the intercepted DNS request being associated with the information being blocked from the computing device, wherein the interception of the DNS request includes at least one of: an identification of an application making the DNS request, and obtaining information about one or more Universal Resource Locators (URLs) from the DNS request;
      obtain a set of rules for a transmission of the intercepted DNS request, wherein the configuration for obtaining of the set of rules comprises a configuration for selecting the set of rules from a database based on the one or more URLs in the intercepted DNS request and information about the application making the DNS request, wherein the information about the application includes at least an identifier of the application, and wherein in each selected rule of the set of rules: the information about the application making the DNS request corresponds to information about the application contained in the selected rule and the URL from the intercepted DNS request made by the application corresponds to information about the URL contained in the selected rule;
      determine whether at least one rule of the obtained set of rules subscribes to a blocking of the transmission of the intercepted DNS request; and
      block the transmission of the intercepted DNS request when at least one rule of the set of rules subscribes to the blocking of the transmission of the intercepted DNS request, wherein the blocking of the transmission of the intercepted DNS request blocks the information from being received on the computing device.

6. The system of claim 5, wherein the configuration for obtaining of the set of rules further comprises a configuration for:
   estimating a probability of the intercepted DNS request being a DNS request that was initiated by one or more actions of a user and wherein the configuration for blocking the transmission of the DNS request comprises a configuration for selectively blocking the transmission of the intercepted DNS request based on the estimated probability.

7. The system of claim 5, wherein the configuration for obtaining of the set of rules further comprises a configuration for:
   estimating a probability of the intercepted DNS request having a characteristic of a DNS request made for downloading of advertising information from a remote server and wherein the configuration for blocking the transmission of the DNS request comprises a configuration for selectively blocking the transmission of the intercepted DNS request based on the estimated probability.

8. The system of claim 5, wherein the interception of the DNS request is performed using a DNS proxy provider.

9. A non-transitory computer readable medium storing thereon computer executable instructions for blocking information from being received on a computing device, including instructions for:
   intercepting, by a processor of the computing device, a Domain Name System (DNS) request, the intercepted DNS request being associated with the information being blocked from the computing device, wherein the interception of the DNS request includes at least one of: an identification of an application making the DNS request, and obtaining information about one or more Universal Resource Locators (URLs) from the DNS request;
   obtaining, by the processor of the computing device, a set of rules for a transmission of the intercepted DNS request, wherein the obtaining of the set of rules comprises selecting the set of rules from a database based on the one or more URLs in the intercepted DNS request and information about the application making the DNS request, wherein the information about the application includes at least an identifier of the application, and wherein in each selected rule of the set of rules: the information about the application making the DNS request corresponds to information about the application contained in the selected rule and the URL from the intercepted DNS request made by the application corresponds to information about the URL contained in the selected rule;
   determining, by the processor of the computing device, whether at least one rule of the obtained set of rules subscribes to a blocking of the transmission of the intercepted DNS request; and
   blocking, by the processor of the computing device, the transmission of the intercepted DNS request when at least one rule of the set of rules subscribes to the blocking of the transmission of the intercepted DNS request, wherein the blocking of the transmission of the intercepted DNS request blocks the information from being received on the computing device.

10. The non-transitory computer readable medium of claim 9, the instructions for obtaining of the set of rules comprising further instructions for:
   estimating a probability of the intercepted DNS request being a DNS request that was initiated by one or more actions of a user and wherein the instructions for blocking the transmission of the intercepted DNS request further comprise instructions for selectively blocking the transmission of the intercepted DNS request based on the estimated probability.

11. The non-transitory computer readable medium of claim 9, the instructions for obtaining of the set of rules comprising further instructions for:
   estimating a probability of the intercepted DNS request having a characteristic of a DNS request made for downloading of advertising information from a remote server and wherein the instructions for blocking the transmission of the intercepted DNS request further comprise instructions for selectively blocking the transmission of the intercepted DNS request based on the estimated probability.

\* \* \* \* \*